United States Patent
Ripattila

(10) Patent No.: US 9,664,199 B2
(45) Date of Patent: May 30, 2017

(54) CENTRIFUGAL PUMP, A SHAFT THEREFOR AND A SLEEVE FOR COUPLING THE SHAFT OF A CENTRIFUGAL PUMP TO A SHAFT OF A DRIVE MOTOR

(71) Applicant: Sulzer Pumpen AG, Winterthur (CH)

(72) Inventor: Janne Ripattila, Kouvola (FI)

(73) Assignee: Sulzer Management AG, Winterthur (CH)

( * ) Notice: Subject to any disclaimer, the term of this patent is extended or adjusted under 35 U.S.C. 154(b) by 184 days.

(21) Appl. No.: 14/160,719

(22) Filed: Jan. 22, 2014

(65) Prior Publication Data
US 2014/0205477 A1    Jul. 24, 2014

(30) Foreign Application Priority Data
Jan. 23, 2013   (EP) .................................... 13152413

(51) Int. Cl.
| | |
|---|---|
| *F04D 29/044* | (2006.01) |
| *F04D 25/06* | (2006.01) |
| *F04D 29/042* | (2006.01) |
| *F04D 17/10* | (2006.01) |
| *F16D 3/06* | (2006.01) |
| *F16D 1/06* | (2006.01) |
| *F04D 13/02* | (2006.01) |
| *F04D 29/62* | (2006.01) |

(52) U.S. Cl.
CPC ......... *F04D 29/042* (2013.01); *F04D 13/021* (2013.01); *F04D 17/10* (2013.01); *F04D 29/044* (2013.01); *F04D 29/622* (2013.01); *F16D 1/06* (2013.01); *F16D 3/06* (2013.01); *F04D 25/06* (2013.01)

(58) Field of Classification Search
CPC .... F04D 29/042; F04D 29/044; F04D 29/622; F04D 13/021; F04D 17/10; F04D 25/06; F16D 1/06; F16D 3/06
USPC ................................ 417/423.6, 424.1, 424.2
See application file for complete search history.

(56) References Cited

U.S. PATENT DOCUMENTS 2,455,022 A * 11/1948 Schmidt .................... F04B 1/14
                                                      417/271
2,678,840 A *  5/1954 Coffing ................... F16D 1/033
                                                      403/337

(Continued)

FOREIGN PATENT DOCUMENTS

| CN | 202441614 U | 9/2012 |
| GB |   972321 A  | 10/1964 |

OTHER PUBLICATIONS

European Search Report mailed Jul. 11, 2013, for Application No. 13152413.4 (6 pages).

*Primary Examiner* — Charles Freay
*Assistant Examiner* — Thomas Cash
(74) *Attorney, Agent, or Firm* — Kilpatrick Townsend & Stockton LLP

(57) ABSTRACT

The present invention relates to a centrifugal pump, especially to a close coupled centrifugal pump. The centrifugal pump (10) comprises a shaft (18) coupled with the shaft (20) of the electric drive motor by means of a separate threaded coupling sleeve (24). The threaded coupling sleeve (24) is coupled with the shaft (20) of the drive motor by means of a key (34) and an adjusting nut (26).

12 Claims, 3 Drawing Sheets

(56) References Cited

U.S. PATENT DOCUMENTS

| | | | | |
|---|---|---|---|---|
| 2,850,982 A * | 9/1958 | Fabrin | F04D 29/044 | 403/202 |
| 3,034,443 A * | 5/1962 | Hinrichs | F04D 29/044 | 415/208.1 |
| 3,500,660 A * | 3/1970 | Anderson | F16D 1/076 | 403/336 |
| 3,782,860 A * | 1/1974 | DeLancey | F04B 49/02 | 415/901 |
| 3,936,221 A * | 2/1976 | Lobanoff | F04D 29/043 | 415/168.3 |
| 3,961,758 A * | 6/1976 | Morgan | F04D 7/045 | 241/185.6 |
| 4,118,142 A * | 10/1978 | Hahs | F04D 13/021 | 415/69 |
| 4,147,468 A * | 4/1979 | Murakami | F04D 7/04 | 403/29 |
| 4,487,029 A * | 12/1984 | Hidaka | B60H 1/3222 | 417/319 |
| 4,692,053 A * | 9/1987 | Sampedro | F01P 5/04 | 123/41.49 |
| 4,730,951 A * | 3/1988 | Barnsfather | F16D 1/0864 | 403/24 |
| 4,778,334 A * | 10/1988 | Medgyesy | F04D 1/066 | 415/199.1 |
| 4,854,828 A * | 8/1989 | Haentjens | F04D 13/021 | 417/360 |
| 4,900,178 A * | 2/1990 | Haldric | B62D 1/16 | 403/12 |
| 4,966,474 A * | 10/1990 | Geiger | F16B 39/02 | 384/517 |
| 5,102,308 A * | 4/1992 | Bordelon | F04D 3/00 | 415/110 |
| 5,378,124 A * | 1/1995 | Welch | F04D 13/06 | 134/57 D |
| 5,482,432 A * | 1/1996 | Paliwoda | F04D 13/021 | 123/41.46 |
| 6,007,313 A * | 12/1999 | Sigel | F04D 29/0413 | 417/424.1 |
| 6,036,451 A * | 3/2000 | Badger | E21B 17/0426 | 29/890.124 |
| 6,135,664 A * | 10/2000 | Eckendorff | B60S 1/3418 | 403/13 |
| 6,398,521 B1 * | 6/2002 | Yorulmazoglu | F04D 13/021 | 403/298 |
| 6,824,471 B2 * | 11/2004 | Kamenov | F04D 13/021 | 403/13 |
| 7,239,056 B1 * | 7/2007 | Griggs | H02K 5/124 | 310/87 |
| 7,726,900 B2 * | 6/2010 | Bourges | C25C 3/14 | 173/171 |
| 8,529,222 B2 * | 9/2013 | Burns | F04D 13/021 | 277/370 |
| 8,876,500 B2 * | 11/2014 | Brown | F04D 13/021 | 403/293 |
| 2002/0176739 A1 * | 11/2002 | Goto | F16B 5/0233 | 403/301 |
| 2003/0049073 A1 * | 3/2003 | Ross | F16D 1/076 | 403/337 |
| 2005/0047944 A1 * | 3/2005 | Howard | F04D 1/063 | 417/423.3 |
| 2005/0169783 A1 * | 8/2005 | Biver | F04D 29/628 | 417/423.15 |
| 2005/0191192 A1 * | 9/2005 | Heng | F04D 29/628 | 417/424.1 |
| 2006/0024174 A1 * | 2/2006 | Welch | F04D 1/063 | 417/360 |
| 2006/0222537 A1 * | 10/2006 | Kilty | F04D 29/043 | 417/423.6 |
| 2007/0166178 A1 * | 7/2007 | Moreland | F04D 1/063 | 417/423.3 |
| 2008/0080987 A1 * | 4/2008 | Zhang | F04D 13/022 | 417/319 |
| 2009/0297261 A1 * | 12/2009 | Mons | F16B 19/02 | 403/337 |
| 2013/0058774 A1 * | 3/2013 | Fluckiger | F04D 29/428 | 415/204 |

\* cited by examiner

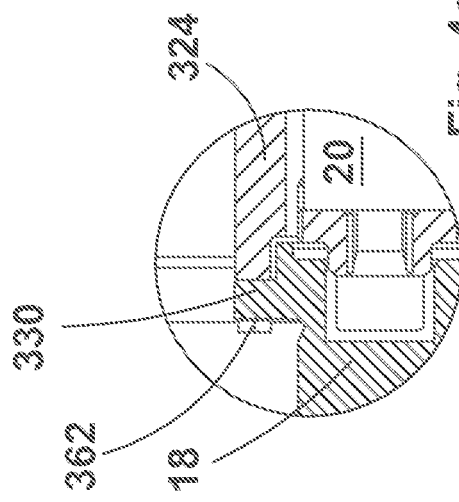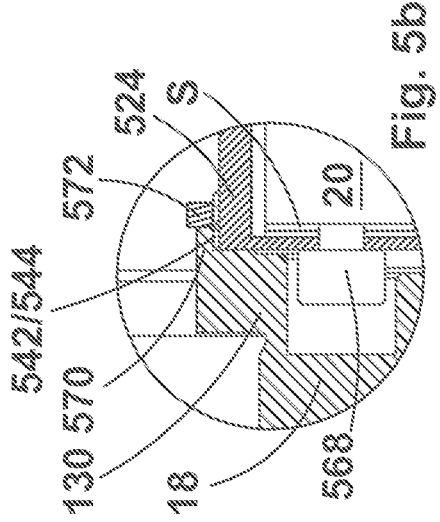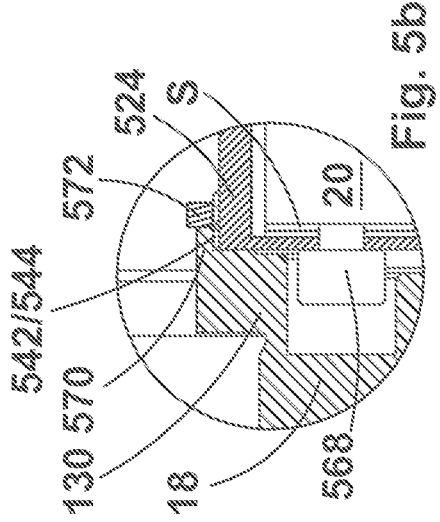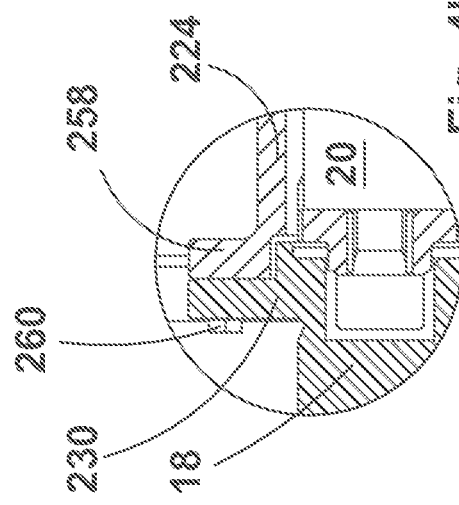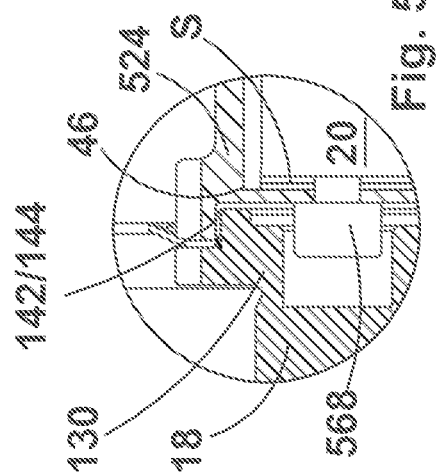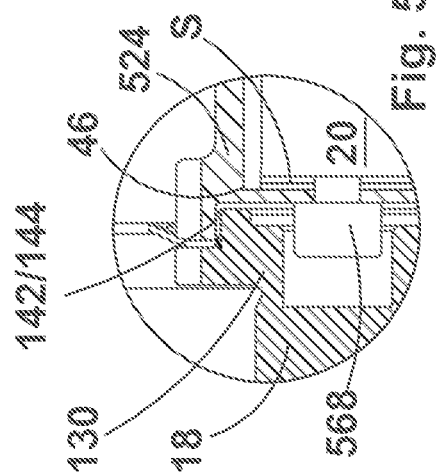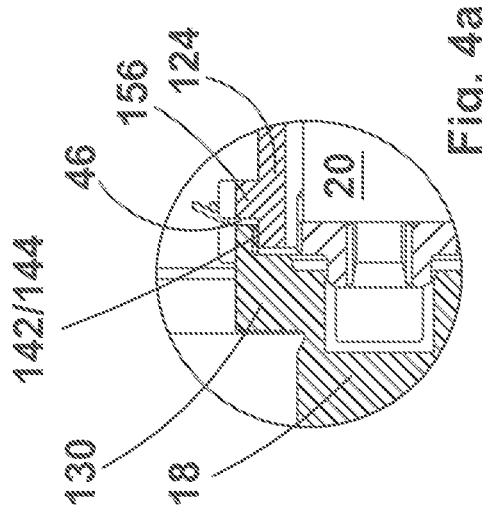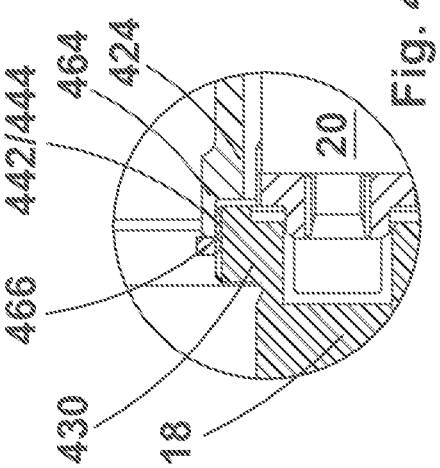

CENTRIFUGAL PUMP, A SHAFT THEREFOR AND A SLEEVE FOR COUPLING THE SHAFT OF A CENTRIFUGAL PUMP TO A SHAFT OF A DRIVE MOTOR

This application claims the priority of European Patent Application No. 13152413.4 filed Jan. 23, 2013, the disclosure of which is incorporated herein by reference.

TECHNICAL FIELD

The present invention relates to a centrifugal pump. The present invention relates especially to a centrifugal pump—drive motor combination, the structure of which is simplified by arranging the impeller of the centrifugal impeller to be supported by the bearings of the electric drive motor. Such a pump is generally called a Close Coupled centrifugal pump. The present invention further relates to a separate coupling sleeve for coupling a shaft of a centrifugal pump to a shaft of a drive motor.

BACKGROUND ART

Close Coupled—centrifugal pumps do not, as already mentioned above, have separate bearings for the shaft of the impeller, but the bearings of the electric motor carry all the loads subjected to the shaft, i.e. both radial and axial forces as well as the weight of the impeller and the shaft end hanging outside the housing or bearings of the electric motor. In close coupled centrifugal pumps the shaft of the electric motor may extend to such a length that the centrifugal impeller is fastened directly to the end of the shaft of the electric drive motor. Another exemplary alternative is that the electric drive motor is a standard one, based for instance on IEC- or NEMA-standards, having a substantially short shaft extending out of the motor housing. In the latter case the shaft of the impeller or, in fact, of the centrifugal pump is arranged as an extension of the shaft of the electric motor. In other words, the shaft of the centrifugal pump is by some appropriate means, like flange coupling or shrink fitting, coupled or fastened to the end of the shaft of the electric motor.

A problem relating to the use of drive motors in accordance with IEC- or NEMA-standards is the adjustment of the running clearance of the impeller of the centrifugal pump, especially in relation to the rear wall or casing cover of the centrifugal pump. A normal option would be to provide the various factors, i.e. the length of the shaft of the centrifugal pump and the length or dimension the shaft of the electric motor extends out of the housing of the electric motor, having an effect on the running clearance with proper tolerances, but the tolerances, or the tolerance range, for the length or dimension of the shaft of the electric motors manufactured in accordance with the standards, are too wide. In other words, as long as standard electric motors are used for driving centrifugal pumps, the shaft construction of the electric motors cannot be changed. In some cases this results in the running clearance of the impeller being too wide in spite of the fact that the shaft of the centrifugal pump is manufactured as accurately as it is normally done.

The running clearance has to be wide enough so that the impeller does not get into physical contact with the rear wall or the casing cover of the pump. This kind of a structure leads in the reduction in both the efficiency and the head of the pump.

GB 972,321 discusses a centrifugal pump drive motor combination where the shaft of the centrifugal pump impeller is supported by the shaft of the electric drive motor. The supporting is realized by providing the drive motor shaft with a hollow internally splined end portion, and the centrifugal pump shaft by means of an externally splined end portion that fits into and cooperates with the hollow end portion of the drive shaft. On the one hand, the drive motor shaft is provided with a long screw extending through the shaft such that by means of the screw the centrifugal pump shaft may be drawn towards the drive motor shaft. And on the other hand, the centrifugal pump shaft is provided with threads beside the splined end portion such that a nut arranged on the threads cooperates with the end surface of the drive shaft and tends to move the centrifugal pump shaft away from the drive shaft. The axial adjustment of the centrifugal pump shaft is performed by means of, for instance, adjusting the correct impeller clearance by threading the nut, whereafter the screw is tightened, thus locking the axial position of the centrifugal pump shaft.

U.S. Pat. No. 4,118,142 discusses an adjustable coupling for operatively connecting the shaft of a low-pressure deep well pump to the shaft of a high-pressure booster pump whereby both pumps may be driven by a common prime mover. The adjustable coupling is formed of a coupling assembly fastened to the end of a hollow electric motor drive shaft arranged on and at a clearance to the shaft of the pump impeller. The clutch assembly is coupled to the impeller shaft by means of a key, which allows the impeller shaft to be moved axially in relation to the drive shaft. The impeller shaft is provided with threads, which cooperate with a nut so that when threading the nut the impeller shaft is moved in relation to the drive shaft. After a correct position of the drive shaft is found the nut is locked by means of screws to the clutch assembly.

BRIEF SUMMARY OF THE INVENTION

Thus an object of the present invention is to develop a new type of a centrifugal pump capable of solving at least one of the above discussed problems.

Another object of the present invention is to develop such coupling means for attaching the shaft of the centrifugal pump to the shaft of the electric drive motor that the running clearance of the centrifugal impeller may be properly adjusted irrespective of the changes in the dimension or length the shaft of the electric drive motor extends out of its housing.

A further object of the present invention is to develop such coupling means for attaching the shaft of the centrifugal pump to the shaft of the electric drive motor that both standard drive motors and standard shafts for centrifugal pumps may be used. Thereby the use of separate adjustable coupling means is needed.

At least one of the objects of the present invention is fulfilled by a centrifugal pump having a shaft, an impeller on the shaft and a volute casing housing the impeller, the volute casing being attached by fastening means to an electric drive motor having a shaft, the shaft of the centrifugal pump being coupled to the shaft of the electric motor such that the shaft of the drive motor supports both the shaft and the impeller of the centrifugal pump, the shaft of the centrifugal pump being attached to an end of the shaft of the electric drive motor by means of a separate axially adjustable coupling sleeve arranged on the shaft of the drive motor, wherein the shaft of the drive motor and the separate axially adjustable coupling sleeve are provided with means for adjusting the axial position of the separate axially adjustable coupling sleeve in relation to the shaft of the drive motor.

At least one of the objects of the present invention is also fulfilled by a coupling sleeve for coupling a shaft of a centrifugal pump to a shaft of a drive motor, the coupling sleeve being arranged, when in use, on the shaft of the drive motor, wherein the coupling sleeve comprises a thread for coupling the coupling sleeve with the shaft of the centrifugal pump.

At least one of the objects of the present invention is also fulfilled by a coupling sleeve for coupling a shaft of a centrifugal pump to a shaft of a drive motor, the coupling sleeve being arranged, when in use, on the shaft of the drive motor, wherein the coupling sleeve comprises a groove for a key for communicating with the shaft of the drive motor and an internal thread for adjusting the axial position of the coupling sleeve in relation to the shaft of the drive motor.

Other characterizing features of the centrifugal pump and the coupling sleeve of the present invention become evident in the accompanying dependent claims.

BRIEF DESCRIPTION OF DRAWING

The centrifugal pump and a separate coupling sleeve for coupling a shaft of a centrifugal pump to a shaft of a drive motor of the present invention are described more in detail below, with reference to the accompanying drawings, in which FIGS. 5a and 5b illustrate enlarged cross sectional views of two exemplary optional alternatives for coupling the shaft of the centrifugal pump to a separate coupling sleeve arranged on the shaft of the electric drive motor in accordance with a second preferred embodiment of the present invention.

DETAILED DESCRIPTION OF DRAWINGS

Figure 1:
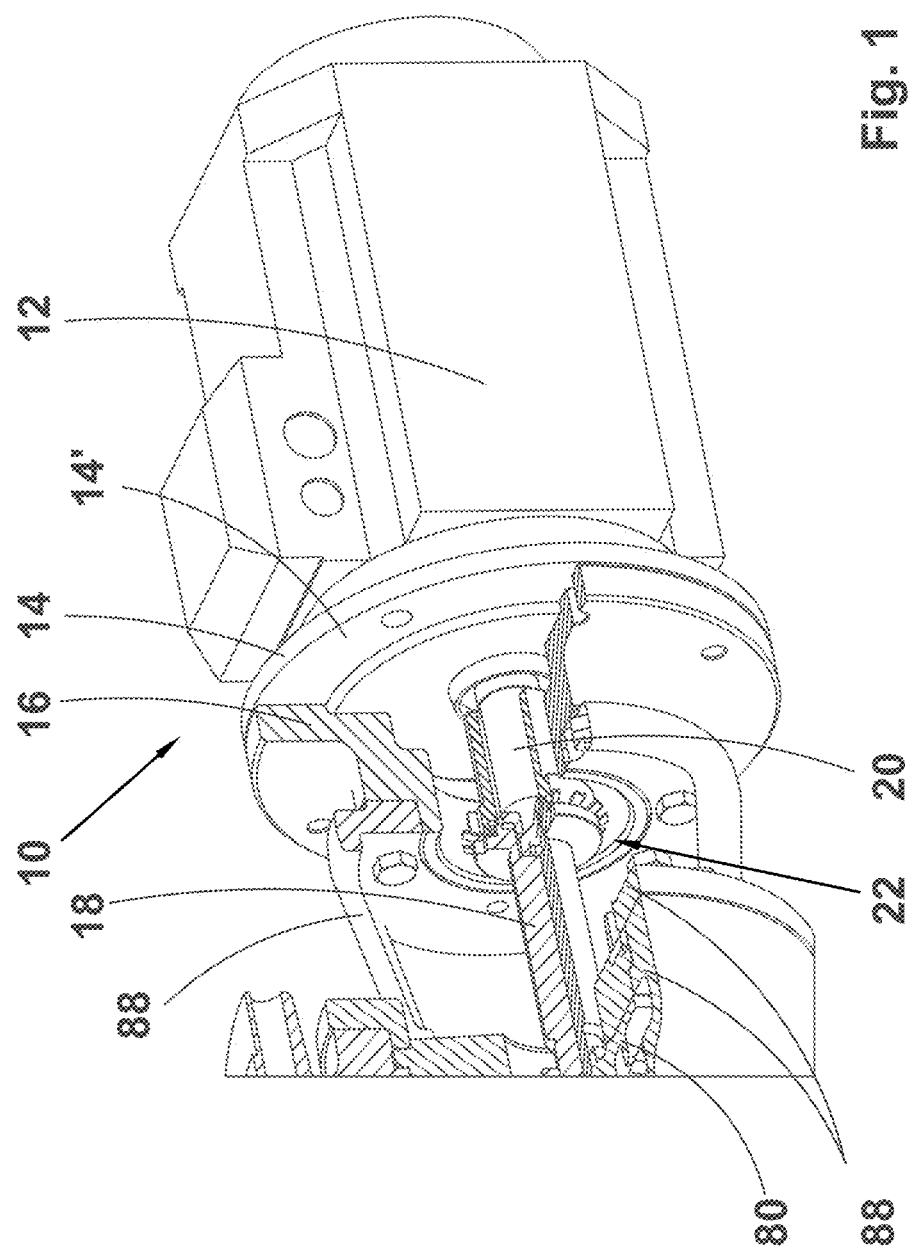
FIG. 1 illustrates schematically a partial cross sectional view of a close coupled centrifugal pump in accordance with a first preferred embodiment of the present invention.

FIG. 1 is a general partial cross sectional illustration of a close coupled centrifugal pump 10 in accordance with a first preferred embodiment of the present invention. The close coupled centrifugal pump 10 shown in FIG. 1 comprises an electric drive motor 12 with an attachment flange 14 attached or arranged or integrated to its housing and a centrifugal pump volute casing 88 (not shown) attached to the flange 14 of the drive motor 12 by fastening means 16. The fastening means may be formed of the pump casing or may be a part, i.e. a so called adapter, separately attached thereto. The fastening means 16 surrounds a shaft 18 of the centrifugal pump 10, the shaft 18 being provided at its end opposite to the drive motor 12 with an impeller 80. The electric motor 12 is provided with a shaft 20 extending to a certain length out of its housing or, importantly, to a certain length from the attachment surface 14' of the flange 14. The shaft 18 of the centrifugal pump 10 is, naturally, aligned with the shaft 20 of the electric motor and coupled or fastened thereto with coupling means 22 discussed in more detail in FIGS. 2-5b.

Figure 3:
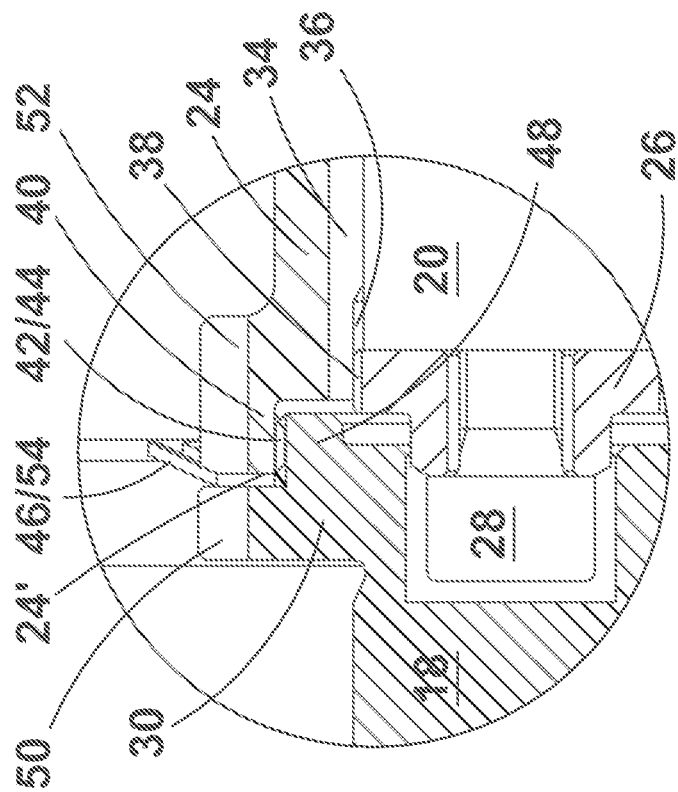
FIG. 3 illustrates an enlarged cross sectional view of the coupling between the shaft of the centrifugal pump and the shaft of the electric drive motor of FIG. 2, FIGS. 4a to 4d illustrate enlarged cross sectional views of various exemplary optional alternatives for coupling the shaft of the centrifugal pump to a separate coupling sleeve arranged on the shaft of the electric drive motor in accordance with a first preferred embodiment of the present invention.
Figure 2:
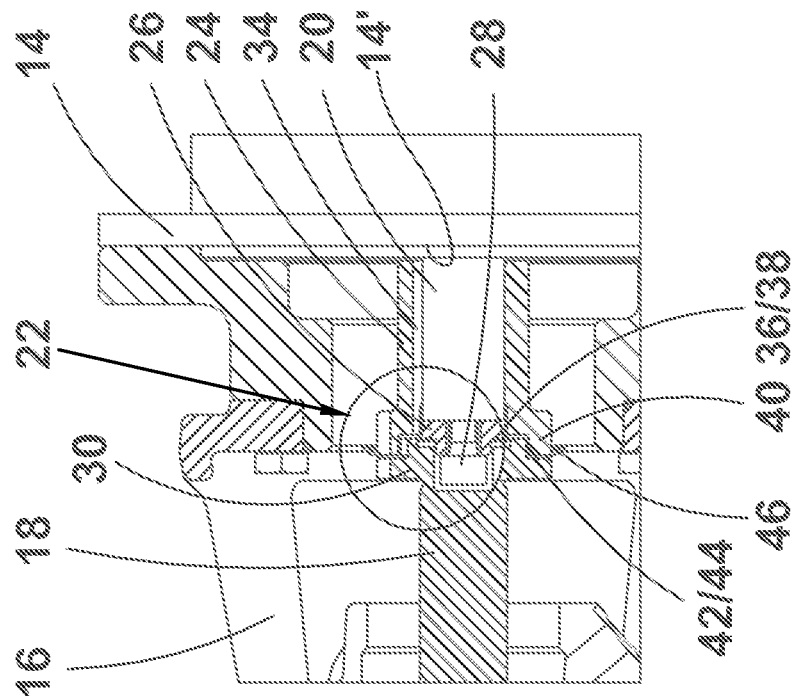
FIG. 2 illustrates a more detailed cross sectional view of a close coupled centrifugal pump of FIG. 1.

FIGS. 2 and 3 discuss a first preferred embodiment of the adjustable coupling means 22 in more detail. The adjustable coupling means with which the shaft 18 of the centrifugal pump is coupled to the end of the shaft 20 of the electric drive motor 12 comprises in this embodiment a separate threaded coupling sleeve 24, which is arranged on the shaft 20 of the electric motor. The coupling means further comprises an adjustment nut 26, which may be fastened to the end of the shaft 20 of the drive motor by means of a locking screw 28. There is a central threaded blind hole at the end of the shaft 20 of the drive motor 12 for the locking screw 28. The nut 26 is freely rotatable on the locking screw 28 until the nut 26 is tightened by the locking screw 28 against the end surface of the shaft 20. The adjustment nut 26 is used for securing the threaded coupling sleeve 24 in a desired axial position. The adjustable coupling means 22 may also comprise a flange 30 arranged to the end of the shaft 18 of the centrifugal pump 10, and a retainer ring 46 arranged between the threaded sleeve 24 and the flange 30.

The separate threaded coupling sleeve 24 is fitted on the shaft 20 of the electric drive motor 12 by means of an axial key 34 transferring the torque of the electric motor from the shaft 20 to the threaded sleeve 24. In other words, for example, both the threaded sleeve 24 and the shaft 20 have axial grooves, in which a key 34 is arranged, whereby the separate threaded coupling sleeve 24 is still mobile and its position in relation to the shaft 20 of the electric motor adjustable in axial direction. The axial forces are transferred between the shaft 20 and the separate threaded coupling sleeve 24 by means of the adjustment nut 26 fastened by means of the locking screw 28 to the end of the shaft 20. The end of the shaft 18 of the centrifugal pump 10 is preferably, but not necessarily, provided with a cavity for the head of the locking screw 28. For both transferring the axial forces and for adjusting the axial position of the separate threaded coupling sleeve 24 the sleeve 24 is provided at its end facing the centrifugal pump with an internal thread 36 communicating or cooperating with a thread 38 on the outer surface of the adjustment nut 26. When adjusting the axial position of the separate threaded coupling sleeve 24 by means of the nut 26, the nut 26 is, in practice, used for adjusting the running clearance of the centrifugal impeller.

The separate threaded coupling sleeve 24 is, in accordance with a first option of various exemplary coupling alternatives, provided radially outside of the thread 36 with an axially extending, preferably cylindrical, part 40, which has inside thereof a thread 42, which communicates or cooperates with a thread 44 on the outer surface of the flange 30 at the end of the shaft 18 of the centrifugal pump 10. The thread 44 is arranged on an axially extending annular part 48 of the flange 30. Thus the shaft 18 of the centrifugal pump may be screwed inside the separate threaded coupling sleeve 24, whereby its direction remains axial. The flange 30 at the end of the shaft 18 extends radially outside of the thread 44 so that a retainer ring 46 may be positioned between the end faces of the threaded coupling sleeve 24 and the flange 30. Both the outer circumference of the flange 30 and the outer circumference of the separate threaded coupling sleeve 24 (at its end part facing the pump) are provided with axial grooves 50 and 52, respectively, at regular intervals. However, the intervals in the flange 30 and in the threaded coupling sleeve 24 are preferably (but not necessarily) not the same. The retainer ring 46 has at its outer circumference teeth 54 preferably (but not necessarily) at regular intervals such that the circumferential width of the teeth 54 corresponds to the width of the grooves 50 and 52. The retainer ring 46 performs its function i.e. locking the shaft 18 immobile in relation to the threaded coupling sleeve 24 when a few teeth 54 of the retainer ring 46 are bent into a few grooves 50 and 52 on both the flange 30 and the threaded coupling sleeve 24. Additionally, the direction of the threads 42/44 is preferably, but not necessarily, chosen so that the coupling tends to tighten when the pump, or the motor is running.

In this first optional exemplary alternative of the first embodiment of the present invention the coupling of the shaft 18 of the centrifugal pump to the end of the shaft 20 of the electric drive motor 12 takes place as follows. First the running clearance of the centrifugal impeller is taken into account such that the length or dimension of the end of the shaft 20 of the drive motor from attachment surface 14' of the flange 14 (shown in FIGS. 1 and 2) is measured. The required distance (to give the desired running clearance for the impeller) from the end of the shaft 18 to the coupling surface 14' of the flange 14 is known. Also the dimensions of the separate threaded coupling sleeve 24 and the retainer ring 46 are known. By using these dimensions, the axial position of the separate threaded coupling sleeve 24 on the shaft 20 may be calculated. Thereafter the threaded coupling sleeve 24 is slid on the shaft 20 together with the key 34. Next, the adjustment nut 26 is inserted against the end of the shaft 20 with the locking screw 28 by threading the nut inside the threaded coupling sleeve 24. The distance between the end face 24' (FIG. 3) of the threaded coupling sleeve 24 opposite to the drive motor 12 and the attachment surface 14' of the flange 14 is adjusted by the nut 26 to the calculated one whereafter the nut 26 is locked in place against the end of the shaft 20 by means of the locking screw 28, whereby the separate coupling sleeve 24 is in axial direction immobile and rotates only with the shaft 20 driven by the key 34.

Thereafter, the retainer ring 46 is placed between the end faces of the shaft 18 and the separate threaded coupling sleeve 24, whereafter the shaft 18 of the centrifugal pump is fastened to the threaded coupling sleeve 24 by threading the shaft 18 in its place in connection with the threaded coupling sleeve 24 leaving the retainer ring 46 between the end faces of the flange 30 and the threaded coupling sleeve 24. The attachment is preferably tightened to a desired torque, whereafter the teeth 54 of the retainer ring are bent into grooves 50 and 52 on the outer circumferences of the flange 30 and the threaded coupling sleeve 24.

Naturally, in accordance with a second exemplary alternative (FIG. 4a) for arranging the coupling of the shaft 18 to the separate coupling sleeve 124 the axially extending annular part of the flange 130 at the end of the shaft 18 is provided with an internal thread 144, and the separate coupling sleeve 124 a corresponding external thread 142. The separate coupling sleeve 124 also has an external shoulder 156 at a distance from the end face of the coupling sleeve 124. Now the shoulder surface facing the end of the shaft 18 of the centrifugal pump acts as the surface of the separate coupling sleeve 124 whose distance from the attachment surface of the flange dictates the position of the centrifugal impeller. The coupling of the shaft 18 to the separate coupling sleeve 124 takes place as discussed already earlier, i.e. the retainer ring 46 is placed between the end faces of the flange 130 of the shaft 18 and the threaded coupling sleeve 124, whereafter the shaft 18 of the centrifugal pump is fastened or coupled to the separate threaded coupling sleeve 124 by threading the shaft 18 in its place in connection with the threaded coupling sleeve 124 leaving the retainer ring 46 between the end faces of the flange 130 and the separate threaded coupling sleeve 124. The attachment is preferably tightened to a desired torque, whereafter the teeth of the retainer ring 46 are bent into grooves on the outer circumferences of the shoulder 156 and the annular part of the flange 130 at the end of the shaft 18. The means for adjusting the axial position of the separate threaded coupling sleeve 124 in relation to the shaft 20 are the same as discussed in connection with FIGS. 2 and 3.

A third exemplary alternative (FIG. 4b) is to provide both the end of the shaft 18 and the separate threaded coupling sleeve 224 with radial outwardly extending flanges 230 and 258 and to arrange the coupling of the shaft 18 to the separate coupling sleeve 224 between the flanges 230/258 by means of screws or bolts 260. The means for adjusting the axial position of the separate threaded coupling sleeve 124 in relation to the shaft 20 are the same as discussed in connection with FIGS. 2 and 3.

A fourth exemplary alternative (FIG. 4c) is to provide the end of the shaft 18 with radial outwardly extending flange 330 and the end of the separate threaded coupling sleeve 324 with blind threaded holes, whereby the flange 330 may be fastened against the end of the coupling sleeve 324 with screws 362 threaded into the blind holes. The means for adjusting the axial position of the separate threaded coupling sleeve 124 in relation to the shaft 20 are the same as discussed in connection with FIGS. 2 and 3.

In a fifth exemplary alternative (shown in FIG. 4d) the thread 444 arranged in connection with the outer circumference of the flange 430 at the end of the shaft 18 of the centrifugal pump extends to the entire axial width or length of the flange 430. Here, the separate coupling sleeve 424 on the shaft 20 of the drive motor has an axially extending annular ring portion 464 with an internal thread 442 such that the shaft 18 of the centrifugal pump may be threaded inside the coupling sleeve 424. Before coupling the shaft 18 to the separate coupling sleeve 424 the coupling sleeve is adjusted in desired axial position by means of the adjustment nut and the internal thread in the separate coupling sleeve as discussed in connection with FIGS. 2 and 3. When coupling the shaft 18 to the coupling sleeve 424 a locking nut or ring 466 is threaded on the flange 430 of the shaft 18, whereafter the shaft 18 may be threaded inside the annular ring portion 464 of the separate coupling sleeve 424, whereby the shaft 18 may be kept immobile in relation to the coupling sleeve 424 by means of tightening the locking nut or ring 466 against the end surface of the separate coupling sleeve 424.

As a second preferred embodiment of the present invention the use of shims S for adjusting the coupling between the shaft 18 of the centrifugal pump and the shaft 20 of the drive motor will be discussed in the following and referring to FIGS. 5a and 5b. In other words, as soon as the desired distance from the attachment surface 14' (shown in FIGS. 1 and 3) of the flange 14 to the end of the shaft 18 is known the coupling between the shaft 18 and the separate coupling sleeve 524 may be provided with shims S to adjust the impeller running clearance.

In this embodiment the separate coupling sleeve on the shaft 20 of the electric motor need not be provided with internal threads, as the adjustment is arranged by other means. The separate coupling sleeve 524 may be arranged axially movable or the coupling sleeve may be, for instance, shrink fitted on the shaft 20

In the first exemplary alternative (shown in FIG. 5a) of the second embodiment the separate coupling sleeve is provided with an axial groove for a key, and the shaft 20 with a similar groove for the same key in the manner discussed in FIGS. 2 and 3. Thus the separate coupling sleeve 524 is axially slidable on the shaft 20. The outer end of the separate coupling sleeve is, preferably but not necessarily, for the most part closed, though including a central hole for a locking screw 568. The correct positioning of the separate coupling sleeve 524 in relation to the shaft 20 is adjusted by arranging a certain amount of shims S inside the coupling sleeve 524 against the end face of the shaft 20. When the locking screw 568 is tightened the separate coupling sleeve 524 is in correct position, and any one of the optional ways discussed in connection with the first embodiment may be used to couple the shaft 18 of the centrifugal pump to the separate coupling sleeve 524. Here the coupling is performed by means of flange 130 and threads 142 and 144 just like in FIGS. 2 and 3.

In the second exemplary alternative (shown in FIG. 5b) of the second embodiment the separate coupling sleeve 524 is provided with an axial groove for a key, and the shaft 20 with a similar groove for the same key in the manner discussed in FIGS. 2 and 3. Thus the coupling sleeve 524 is axially slidable on the shaft 20. The outer end of the coupling sleeve 524 is for the most part closed, though including a central hole for a locking screw 568. The correct positioning of the separate coupling sleeve 524 in relation to the shaft 20 is adjusted by arranging a certain amount of shims S inside the coupling sleeve 524 against the end face of the shaft 20. When the locking screw 568 is tightened the sleeve 524 is in correct position. In this option the flange 130 at the end of the shaft 18 is provided with an axially extending annular ring 570 having an internal thread 544, and the separate coupling sleeve 524 a corresponding external thread 542. Now the end surface of the coupling sleeve 524 facing the end of the shaft 18 of the centrifugal pump acts as the surface of the separate coupling sleeve 524 whose distance from the attachment surface 14' of the flange 14 (shown in FIGS. 1 and 3) dictates the position of the centrifugal impeller. The coupling of the shaft to the separate coupling sleeve takes place such that locking nut or ring 572 is threaded on the coupling sleeve 524, whereafter the shaft 18 of the centrifugal pump is fastened to the coupling sleeve 524 by threading the shaft 18 in its place in connection with the separate coupling sleeve 524 leaving the shim/s S inside the separate coupling sleeve 524 between the separate coupling sleeve 524 and the end face of the shaft 20. The attachment is preferably tightened to a desired torque, whereafter the locking nut or ring 572 is tightened against the annular ring 570 of the flange 130.

In a third exemplary alternative (not shown) both the end of the shaft and the separate coupling sleeve are provided with radial outwardly extending flanges so that the shaft and the coupling sleeve are coupled together by their flanges by means of screws or bolts, basically as shown in FIG. 4b. The shims adjusting the impeller running clearance are located inside the separate coupling sleeve between the coupling sleeve and the end of the shaft of the drive motor as shown in FIG. 5b.

In a fourth option (not shown) the end of the shaft is provided with radial outwardly extending flange that is coupled directly to the end surface of the separate coupling sleeve in the manner shown in FIG. 4c. Coupling sleeve itself is substantially similar to that shown in FIG. 5b, whereby the shims adjusting the impeller running clearance are inside the separate coupling sleeve between the coupling sleeve and the end of the shaft of the drive motor.

With regard to the above detailed explanation it should be understood that
- The retainer ring 46 together with the grooves on the outer circumferences of the flange 30 and the threaded sleeve 24 (shown in FIGS. 2 and 3) may be replaced with some other locking means known in the art,
- The attachment between the adjusting nut 26 and the separate threaded sleeve 24 (shown in FIGS. 2 and 3), i.e. the thread on the nut, may be provided with a locking ring,
- The locking screw 28 (shown in FIGS. 2 and 3) may be provided with a locking washer between the nut 26 and the head of the screw 28,
- The locking ring or nut (like the one shown by reference numerals 466 and 572) may be used for adjusting the axial position of the shaft 18 of the centrifugal pump in relation to the separate coupling sleeves 424 and 524 alone, i.e. without the use of shims or any shoulder-to-shoulder or any other end contact between the shaft and the coupling sleeve.
- The locking screw 28 may, naturally, be replaced with a headless bolt that is screwed into a blind threaded hole at the end of the shaft of the drive motor, and a locking nut screwed on the bolt As can be seen from the above description a novel centrifugal pump construction has been developed. While the invention has been herein described by way of examples in connection with what are at present considered to be the preferred embodiments, it is to be understood that the invention is not limited to the disclosed embodiments, but is intended to cover various combinations and/or modifications of its features and other applications within the scope of the invention as defined in the appended claims. For instance, it is clear in view of the above discussed exemplary options concerning the two major embodiments that the actual way of coupling the shaft of the centrifugal impeller to the separate coupling sleeve arranged on the shaft of the drive motor may be chosen irrespective of the way the adjustment of the axial position of the impeller is done. Thus, also such coupling—adjustment combinations, which have not been illustrated or discussed in detail above are within the scope of the present invention.

The invention claimed is:

1. A centrifugal pump assembly comprising:
a motor including a motor shaft, the motor shaft having a threaded internal bore;
an impeller including an impeller shaft;
a coupling sleeve connecting the motor shaft to the impeller shaft, the coupling sleeve being arranged on the motor shaft and including a first threaded section; and
an adjustment nut including a second threaded section in threaded communication with the first threaded section allowing the coupling sleeve to be adjustably positioned in an axial position relative to the adjustment nut and motor shaft, the adjustment nut being freely rotatable on a screw threaded into the threaded internal bore and being securable against an end surface of an end of the motor shaft with the screw;
wherein the axial position of the impeller shaft relative to the motor shaft is based on the axial position of the coupling sleeve relative to the adjustment nut and the motor shaft.

2. The centrifugal pump assembly of claim 1, wherein the motor shaft and the coupling sleeve have grooves for an axial key allowing the coupling sleeve to slide axially on the motor shaft and to transfer torque of the motor from the motor shaft to the coupling sleeve.

3. The centrifugal pump assembly of claim 2,
wherein the adjustment nut includes an internal bore; and
wherein the screw passes through the internal bore of the adjustment nut.

4. The centrifugal pump assembly of claim 1, wherein the adjustment nut is configurable to be secured to the end of the motor shaft in any rotational orientation relative to the motor shaft, allowing for stepless adjustment of the axial position of the impeller shaft relative to the motor shaft.

5. The centrifugal pump assembly of claim 1,
wherein the coupling sleeve includes a first groove;
wherein the motor shaft includes a second groove;
wherein a key is received by the first groove and second groove allowing for transfer of torque from the motor shaft to the coupling sleeve and allowing the coupling sleeve to slide axially on the motor shaft when the adjustment nut is not secured to the end of the motor shaft.

6. The centrifugal pump assembly of claim 1, wherein the first threaded section is on an internal surface of the coupling sleeve and the second threaded section is on an external surface of the adjustment nut.

7. The centrifugal pump assembly of claim 1, wherein the motor shaft supports the impeller and impeller shaft via the coupling sleeve.

8. The centrifugal pump assembly of claim 1, wherein coupling sleeve is coupled to the impeller shaft with a third threaded section on the coupling sleeve and a fourth threaded section on the impeller shaft.

9. The centrifugal pump assembly of claim 8, wherein the impeller shaft is secured immobile in relation to the coupling sleeve with at least one of a retainer ring, a locking nut or a ring.

10. The centrifugal pump assembly of claim 1, wherein the coupling sleeve is coupled to the impeller shaft by attaching the coupling sleeve with bolts or screws to a radially extending flange arranged at an end of the impeller shaft.

11. The centrifugal pump assembly of claim 10, wherein the coupling sleeve includes a flange for coupling the coupling sleeve to the impeller shaft.

12. A sleeve for coupling a first shaft of a centrifugal pump to a second shaft of a drive motor, comprising:
a first threaded section for threaded communication with a second threaded section of an adjustment nut and a groove for a key for communicating with the second shaft, the threaded communication and the groove allowing the sleeve to be adjustably positioned in an axial position relative to the adjustment nut and the second shaft;
wherein the axial position of the first shaft relative to the second shaft is based on the axial position of the coupling sleeve relative to the adjustment nut, with the adjustment nut arranged to be fastened to the second shaft.

* * * * *